Oct. 5, 1948.   J. T. BIBB   2,450,574
DRAFT OPERATED ANGLING MECHANISM FOR DISK HARROWS
Filed March 31, 1945
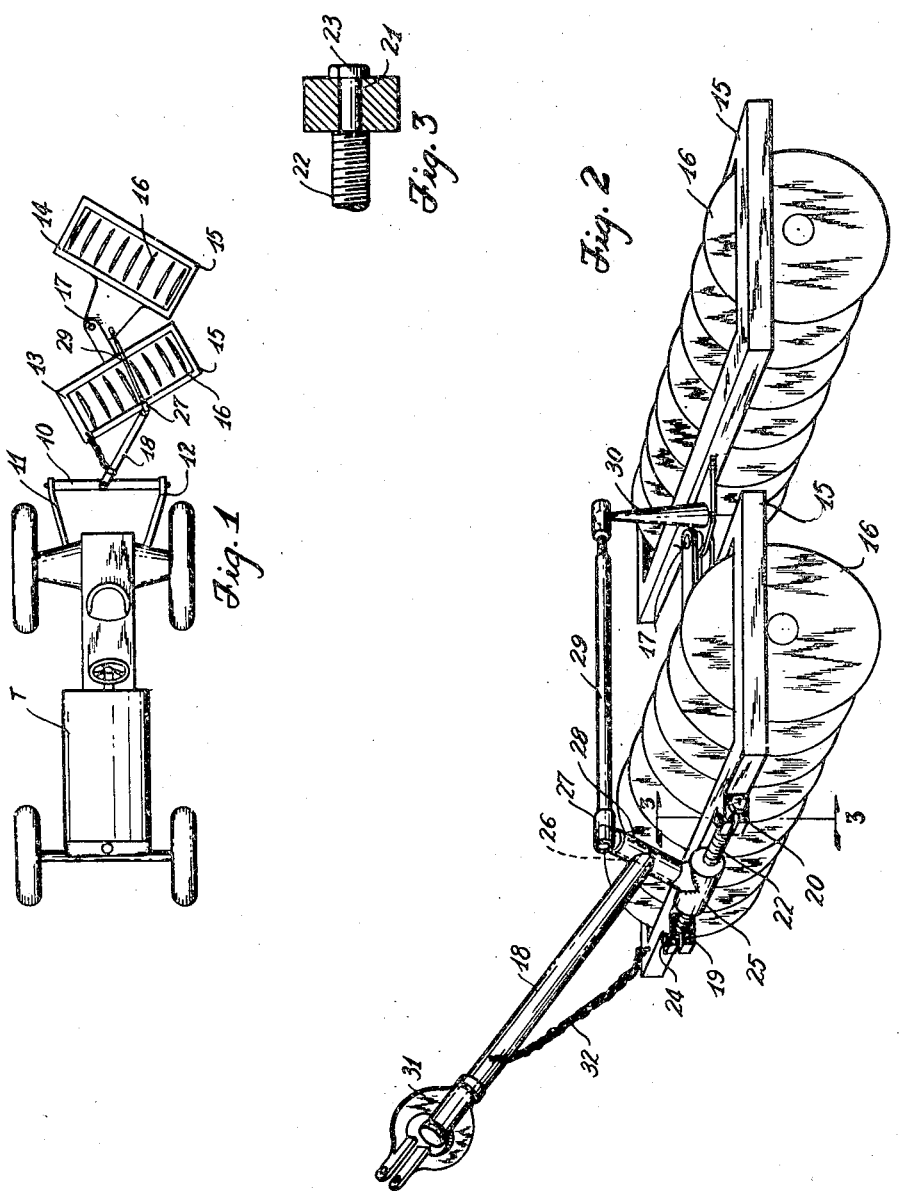
INVENTOR.
BY   JOHN T. BIBB
Hazard & Miller
ATTORNEYS Patented Oct. 5, 1948

2,450,574

UNITED STATES PATENT OFFICE 2,450,574

DRAFT OPERATED ANGLING MECHANISM FOR DISK HARROWS

John T. Bibb, San Luis Rey, Calif.

Application March 31, 1945, Serial No. 585,857

6 Claims. (Cl. 55—83)

This invention relates to improvements in harrows.

A primary object of the invention is to provide an improved disc harrow in which there is at least one harrow truck on which a tongue by which the harrow may be drawn is mounted for vertical swinging movement, and to provide means for forcibly varying the position of the harrow truck with relation to the lining of draft of the harrow upon vertically moving the tongue which draws the harrow.

More specifically, an object of the invention is to provide a harrow which may be of either the tandem type or the offset type wherein there are two harrow trucks connected to each other in such a manner that the angular relationship between the trucks may be varied and to provide a tongue mounted for swinging movement in a vertical plane on one of the trucks and to provide means for forcibly varying the angular relationship between the trucks on vertically moving the tongue.

Harrows embodying the present invention are designed to be drawn by tractors wherein the drawbar of the tractor to which the tongue is adapted to be connected may be forcibly elevated by mechanism on the tractor or optionally allowed to descend from such elevated position. Tractors of the Ford-Ferguson type for example have drawbars that can be forcibly elevated by the tractor mechanism with considerable force. The power thus available to elevate the drawbar can be utilized in accordance with the present invention to open and close the harrow and thus regulate the depth of cut. Consequently if the harrow is drawn over ground having hard and soft spots the depth of cut of the harrow can be regulated from the tractor by raising and lowering its drawbar which regulates the opening and closing of the harrow and controls the depth of cut. The opening and closing of the harrow by the tongue or by the drawbar of the tractor may also be advantageously employed in making sharp turns in that the drag of the harrow can be reduced in making the turn so that tendencies to stall the tractor may be eliminated.

With the foregoing and other objects in view, which will be made manifest in the following detailed description and specifically pointed out in the appended claims, reference is had to the accompanying drawings for an illustrative embodiment of the invention, wherein:

Figure 1 is a top plan view of a tractor of the Ford-Ferguson type illustrating an offset harrow embodying the present invention as having been applied thereto;

Fig. 2 is a perspective view of the offset harrow embodying the present invention;

Fig. 3 is a vertical section taken substantially upon the line 3—3 upon Fig. 2, illustrating a detail of construction.

Referring to the accompanying drawings wherein similar reference characters designate similar parts throughout, the harrows embodying the present invention are designed to be drawn by a tractor T having a drawbar 10 mounted for rotation between arms 11 and 12. These arms are designed to be forcibly raised by the tractor mechanism to forcibly elevate the drawbar 10 and allow it to descend from the elevated position to a position wherein it is designed to tow its maximum load.

In Figs. 1, 2, and 3, I have illustrated the present invention as having been incorporated in a harrow of the offset type wherein there are front and rear harrow trucks 13 and 14 each consisting of a rectangular frame 15 rotatably supporting the harrow discs 16. The two harrow trucks 13 and 14 are pivotally connected to each other as at 17 so that they may assume an angular position with relation to each other as illustrated in Fig. 1, or a substantially parallel position with relation to each other as illustrated in Fig. 2. The extent to which the harrow trucks are held in non-parallel position will govern the depth of penetration of the discs 16 into the soil. The present invention contemplates regulating this angular relationship by vertically swinging the tongue 18 which connects the harrow to the drawbar 10. To this end, the front harrow truck 13 has a pair of forwardly extending bosses 19 and 20 provided thereon which may be horizontally bifurcated to receive the cylindrical ends 21 of a screw 22. This screw may be turned by a hexagonal head or nut 23 when the clamping bolts or screws 24 are loosened. On the screw 22 there is an internally threaded sleeve or nut 25 which has secured thereto an upwardly extending pintle 26 having a bolted upper end indicated at 27. Surrounding this pintle is a rotatable sleeve 28 to which the tongue 18 is rigidly secured. A drag link 29 connects the upper end of the pintle 26 with a post 30 mounted on the rear harrow truck 14. A clevis 31 is rotatable on the upper end of the tongue 18 and serves to connect the tongue to the drawbar 10. It will be appreciated that the rotatable connections between the drawbar 10 and the arms 11 and 12 and between the clevis 31 and the tongue 18, and between the sleeve 28 and the pintle 26, and between the sleeve 25 and the screw 22, permit the harrow to remain in contact with the ground at all times regardless of the position of the tractor T.

The operation of the improved harrow is as follows: Assuming that the harrow is in the open position as illustrated in Fig. 1, and it is desired to close or partially close it from this position as may be occasioned by traversing soft ground or in making a sharp turn it is merely necessary to forcibly elevate the drawbar 10 by the tractor mechanism. When the drawbar 10 is elevated it swings the tongue 18 upwardly causing the sleeve 28 and pintle 26 together with the sleeve or nut 25 to rotate about the screw 22 as a shaft or center. The rearward swinging movement of the upper end of pintle 26 causes the drag link 29 to be forced rearwardly and causes the two harrow trucks to swing relatively to each other about the pivotal connection 17 as a center. The extent to which the harrow trucks have their angular relationship varied depends upon the extent to which the tongue 18 is elevated by the drawbar. When it is desired to have as deep a cut as possible and to have as great an angular relation ship between the harrow trucks as possible the drawbar 10 is allowed to descend as far as it will go. Descent of the tongue 18 causes the drag link 29 to be drawn forwardly thus causing the harrow trucks to assume their fully open position as illustrated in Fig. 1.

It is sometimes desirable to be able to adjust the line of draft and to vary the position of the tongue 18 transversely with respect to the harrow. When this is desired the clamping screws 24 may be loosened and the screw 22 rotated. Rotation of the screw 22 will advance the sleeve or nut 25 to the right or to the left depending upon the direction of rotation. After the tongue has thus been laterally adjusted the screw may be held in adjusted position by again tightening the screws 24. It sometimes occurs that it is desirable to additionally guide the harrow behind the tractor when it is in fully open position. To this end, a chain or the equivalent indicated at 32 may be secured to the front harrow truck somewhat rearwardly of the axis of the screw 22. This chain may be secured to the upper end of the tongue 18. When the tongue is swung downwardly this chain will be drawn taut inasmuch as the tongue swings about an axis namely that of the screw 22 which is disposed forwardly of the point of connection of the chain to the harrow truck. In this manner, when the tongue is in its lowermost position the chain will be tightened and tend to assist in maintaining the harrow in proper position behind the tractor T.

From the above-described construction it will be appreciated that an improved harrow is provided wherein there are a plurality of harrow trucks mounted for adjustment relatively to each other and which may have the angular adjustment forcibly varied by raising and lowering the tongue of the harrow by means of the tractor drawbar. Furthermore, in the construction illustrated in Fig. 1, provision is made for easily and quickly adjusting the position of the tongue laterally with respect to the harrow to secure a proper or desired line of draft.

Various changes may be made in the details of construction without departing from the spirit and scope of the invention as defined by the appended claims.

I claim:

1. A harrow having front and rear harrow trucks connected together so that the angular relationship between the trucks may be varied, a tongue mounted for up and down swinging movement upon the front truck, a drawbar operatively connected to the tongue and means connecting the drawbar to the rear truck whereby on adjusting the vertical position of the tongue the angular relationship between the trucks may be varied.

2. A harrow having front and rear harrow trucks connected together so that the angular relationship between the trucks may be varied, a transversely extending screw on the forward truck, means by which the screw may be rotatably adjusted, a nut on the screw, a pintle on the nut, a tongue having a sleeve rotatably mounted on the pintle, a drag link connected to the pintle, a post on the rear truck to which the drag link is connected, said post being so arranged that on vertically swinging the tongue the angular relationship between the trucks may be forcibly varied.

3. A harrow having front and rear harrow trucks connected together so that the angular relationship between the trucks may be varied, a transversely extending screw on the forward truck, means by which the screw may be rotatably adjusted, a nut on the screw, a pintle on the nut, a tongue having a sleeve rotatably mounted on a pintle, a drag link connected to the pintle, a post on the rear truck to which the drag link is connected, said post being so arranged that on vertically swinging the tongue the angular relationship between the trucks may be forcibly varied, said tongue having a swiveled clevis for attachment to a tractor drawbar.

4. A harrow comprising two harrow trucks pivotally connected together and arranged one behind the other, a tongue pivotally mounted upon the forward truck for up and down swinging movement relatively thereto, and a link pivotally connected to the tongue and to the rear truck and so arranged that upon upward swinging movement of the tongue the trucks will be caused to more nearly approach positions parallel to each other and upon downward swinging movement of the tongue the trucks will be caused to assume positions more angularly related to each other.

5. A harrow comprising two harrow trucks pivotally connected together and arranged one behind the other, a tongue pivotally mounted upon the forward truck for up and down swinging movement relatively thereto, and a link pivotally connected to the tongue and to the rear truck and so arranged that upon upward swinging movement of the tongue the trucks will be caused to more nearly approach positions parallel to each other and upon downward swinging movement of the tongue the trucks will be caused to assume positions more angularly related to each other, and a tension element connecting the tongue to the forward truck.

6. A harrow comprising two harrow trucks pivotally connected together and arranged one behind the other, a tongue pivotally mounted upon the forward truck for up and down swinging movement relatively thereto, and a link pivotally connected to the tongue and to the rear truck and so arranged that upon upward swinging movement of the tongue the trucks will be caused to more nearly approach positions parallel to each other and upon downward swinging movement of the tongue the trucks will be caused to assume positions more angularly related to each other, and means for adjusting the tongue laterally with respect to the forward truck.

JOHN T. BIBB.

REFERENCES CITED

The following references are of record in the file of this patent:

UNITED STATES PATENTS

| Number | Name | Date |
| --- | --- | --- |
| Re. 8,147 | Bayliss | Apr. 2, 1878 |
| 887,810 | Jackson | May 19, 1908 |
| 1,124,028 | Jones | Jan. 5, 1915 |
| 2,247,534 | Von Schlegell | July 1, 1941 |
| 2,337,801 | Cook | Dec. 28, 1943 |
| 2,413,807 | Warne | Jan. 7, 1947 |